United States Patent
Iyer et al.

(10) Patent No.: US 11,206,191 B2
(45) Date of Patent: Dec. 21, 2021

(54) METHOD AND SYSTEM FOR PROVIDING SEAMLESS DATA TRANSFER BETWEEN COMMUNICATION DEVICES

(71) Applicant: Wipro Limited, Bangalore (IN)

(72) Inventors: Manjunath Ramachandra Iyer, Bangalore (IN); Chandrashekar Bangalore Nagaraj, Bangalore (IN); Shashidhar Soppin, Bangalore (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 16/988,868

(22) Filed: Aug. 10, 2020

(65) Prior Publication Data

US 2021/0367856 A1    Nov. 25, 2021

(30) Foreign Application Priority Data

May 22, 2020  (IN) .............................. 202041021532

(51) Int. Cl.
*H04L 12/24* (2006.01)
*H04L 29/08* (2006.01)
*G06N 3/08* (2006.01)
*G06K 9/62* (2006.01)

(52) U.S. Cl.
CPC ............ *H04L 41/16* (2013.01); *G06K 9/6256* (2013.01); *G06N 3/08* (2013.01); *H04L 67/12* (2013.01)

(58) Field of Classification Search
CPC ........... H04L 41/16; H04L 67/12; G06N 3/08; G06K 9/6256
See application file for complete search history.

(56) References Cited

U.S. PATENT DOCUMENTS

| 6,125,122 | A | 9/2000 | Favichia et al. |
| 8,929,262 | B2 | 1/2015 | Feuerstraeter et al. |
| 2016/0198021 | A1 | 7/2016 | Mooney |
| 2021/0044392 | A1* | 2/2021 | Myung .................. H04W 16/14 |
| 2021/0218538 | A1* | 7/2021 | Myung .................. H04L 1/1854 |

FOREIGN PATENT DOCUMENTS

WO    WO-2018125900 A1 *  7/2018  ......... H04L 41/0853

* cited by examiner

*Primary Examiner* — Kostas J Katsikis
(74) *Attorney, Agent, or Firm* — Finnegan, Henderson, Farabow, Garrett & Dunner, LLP

(57) ABSTRACT

Disclosed herein is a method and a data transfer system for providing seamless data transfer between communication devices. Properties of data to be transferred, status of network parameters and power associated with the communication devices are monitored in real time. Further, communication protocols available at the communication devices and a need to switch between the communication protocols are determined. Splitting of the data into subsets of data and sequencing the subsets of data are performed using a neural network, which is trained based on properties of the data, data storage space of the communication devices, speed of data transfer and a communication channel available for the data transfer. The optimum communication protocols are identified based on order of priority value and contention value. The subsets of data are transferred using identified optimum communication protocols, until a change in the monitored status is detected to switch the optimum communication protocols.

18 Claims, 7 Drawing Sheets

| Communication protocols | Network availability | Network coverage range | Data transfer rate | Priority value | Contention value |
|---|---|---|---|---|---|
| Wi-Fi | Yes | Next 100 meters | 54 Mbps | 1 | 16 |
| BLE | Yes | Next few feet | 3 Mbps | 3 | 8 |
| LoRa | Yes | Next few Kilometers | 37 Kbps | 6 | 32 |

Fig. 2b (Table 1)

| Type of data | Size of data | Battery power at first smartphone | Battery power at second smartphone | Range of network available | Network availability | Network suitability |
|---|---|---|---|---|---|---|
| Media | 1GB | 50% | 60% | 1KM | Yes | Yes |
| Audio | 200MB | 20% | 30% | 500M | Yes | No |
| Video | 350MB | 80% | 90% | 50M | No | No |

Fig. 2d (Table 2)

| Type of data | Data transfer rate | Communication Protocol | Sequence ID | Sequence order | Time stamp information | Status of data transfer |
|---|---|---|---|---|---|---|
| Audio | 3 Mbps | Bluetooth Low Energy (BLE) | A1680 | SEQ1 | 1589447405 | PENDING |
| | | | A1682 | SEQ2 | 1589447407 | PENDING |
| Video | 54 Mbps | WiFi | V1684 | SEQ3 | 1589447409 | PENDING |
| | | | V1686 | SEQ4 | 1589447411 | PENDING |
| | | | V1688 | SEQ5 | 1589447413 | PENDING |
| | | | V1690 | SEQ6 | 1589447415 | PENDING |
| | | | V1692 | SEQ7 | 1589447417 | PENDING |

Fig. 2e (Table 3)

| Communication protocol available at the smartphones | Dynamic range of network available | Data transfer rate | Battery power consumption | Priority value | Network availability | Contention value |
|---|---|---|---|---|---|---|
| Wi-Fi | Next 100 meters | High | Medium (20%) | 3 | Yes | 8 |
| BLE | Next few feet | Low | Low (10%) | 1 | Yes | 16 |
| LoRa | Next few Kilometers | Medium | Low (10%) | 1 | Yes | 16 |

Fig. 2f (Table 4)

METHOD AND SYSTEM FOR PROVIDING SEAMLESS DATA TRANSFER BETWEEN COMMUNICATION DEVICES

TECHNICAL FIELD

The present subject matter is generally related to data transfer techniques and more particularly, but not exclusively, to a method and a system for providing seamless data transfer between communication devices.

BACKGROUND

At present, communication devices transfer data utilizing wireless communication protocols. The wireless protocols used for data transfer differ from each other in data rate, wireless link, bandwidth, transmission range, number of communication devices, power consumption and scalability. During data transfer, network parameters associated with the communication devices vary dynamically. In some scenarios, the fluctuation in the network parameters are large enough to interrupt or abruptly end the data transfer process. As a result, the communication device may not resume data transfer from the instant where it is interrupted or terminated. Consequently, data packets which are already transferred are lost at receiving communication devices as the remaining data packets necessary for joining operation are not delivered from the transmitting communication devices. Due to the unsuccessful data delivery in first attempt, the communication devices commence the data transfer process again from the beginning. The improper handling of data transfer creates network overload by frequent retransmission of the data packets, thereby causing wasteful utilization of network bandwidth along with high power consumption at the communication devices.

In some scenarios, users operating communication devices initiate data transfer using short range and power efficient wireless protocol, for example Bluetooth. In such cases, it may be possible that users come out of the Bluetooth network coverage area while the data transfer is ongoing. As a result, the data transfer may be terminated due to mobility of users beyond the allowable transmission range for the corresponding short-range wireless protocols. Further, in some scenarios the size of data to be transferred may be large. In this case, if wireless protocols with higher power consumption (for example Wi-Fi) is selected without considering the remaining battery power of the communicating devices, then the data transfer might be failed due to power constraints. In some scenarios, the user may initiate data transfer utilizing wireless protocols without considering remaining data plan. In such cases, if the data plan is exhausted prior to complete transfer of all data packets, then the process of data transfer is terminated abruptly, and the transferred data packets may be lost. In the aforesaid cases, retransmission of data is required which is time consuming and also involves resource utilization. Thus, resulting in lot of inconvenience to the users.

Further, the existing data transfer systems are not capable enough to handle such problems arising dynamically due to limitations imposed by network parameters associated with wireless protocols and device constraints. In other words, existing data transfer techniques do not consider the constraints associated with each of the wireless protocols, properties of data, status of data plan and power associated with the communicating devices.

The information disclosed in this background of the disclosure section is only for enhancement of understanding of the general background of the invention and should not be taken as an acknowledgement or any form of suggestion that this information forms the prior art already known to a person skilled in the art.

SUMMARY

The present disclosure discloses a method for providing seamless data transfer between communication devices. The method comprises monitoring, by a data transfer system, status of one or more network parameters and power associated with the communication devices in real time along with properties of data to be transferred. Upon monitoring the status, the method comprises determining one or more communication protocols for the data transfer. Each of the one or more communication protocols is associated with a priority value and a contention value. Further, a need to switch between the one or more communication protocols is determined based on the monitored status for providing the seamless data transfer between communication devices. Thereafter, the method comprises preparing for data transfer, by the data transfer system, using one or more determined communication protocols by performing at least one of splitting of the data into one or more subset of data and sequencing the one or more subset of data using a neural network. The neural network is trained based on properties of the data, data storage space of the communication devices, speed of data transfer and a communication channel available for the data transfer. Further, the method comprises identifying, by the data transfer system, one or more optimum communication protocols from the one or more determined communication protocols available for the data transfer using the neural network. The one or more optimum communication protocols is identified for each of the one or more subset of data to be transferred by the neural network based on order of the priority value and the contention value. The order of the priority value and the contention value is updated in real-time based on the monitored status of the one or more network parameters and the power associated with the communication devices. Upon identification of the one or more optimum communication protocols, the method comprises transferring, by the data transfer system, the one or more subset of data along with sequencing information through one or more communication channels. The one or more subset of data is transferred using the identified one or more optimum communication protocols until change in the monitored status of the one or more network parameters and the power associated with the communication devices is detected. Upon detection of the change in the monitored status, the one or more optimum communication protocols is switched for providing the seamless data transfer.

Further, the present disclosure discloses a data transfer system for providing seamless data transfer between communication devices. The data transfer system comprises a processor and a memory communicatively coupled to the processor. When a data transfer request is received at the data transfer system, the processor monitors status of one or more network parameters and power associated with the communication devices in real time along with properties of data to be transferred. Thereafter, the processor determines one or more communication protocols available at the communication devices for the data transfer based on the monitored status. Each of the one or more communication protocols is associated with a priority value and a contention value. The processor also determines a need to switch between the one or more communication protocols for providing the seamless data transfer based on the monitored status. Further, the processor prepares for data transfer using one or more determined communication protocols. The processor utilizes a neural network to perform at least one of splitting of the data into one or more subset of data and sequencing the one or more subset of data. The neural network is trained based on properties of the data, data storage space of the communication devices, speed of data transfer and a communication channel available for the data transfer. Thereafter, the processor, using the neural network, identifies one or more optimum communication protocols for each of the one or more subsets of data to be transferred. The neural network identifies the one or more optimum communication protocols from the one or more determined communication protocols available for the data transfer based on order of the priority value and the contention value. The order of the priority value and the contention value is updated in real-time based on the monitored status of the one or more network parameters and the power associated with the communication devices. Once the one or more optimum communication protocols is identified, the processor transfers the one or more subset of data along with sequencing information until a change in the monitored status associated with the communication devices is detected. The processor transfers the one or more subset of data along with sequencing information through one or more communication channels using the identified one or more optimum communication protocols. When the processor detects a change in the monitored status of the one or more network parameters and the power associated with the communication devices, the one or more optimum communication protocols is switched to provide the seamless data transfer.

Further the present disclosure comprises a non-transitory computer readable medium including instructions stored thereon that when processed by at least one processor causes the processor to provide seamless data transfer between communication devices. Further, the instructions cause the processor to monitor status of one or more network parameters and power associated with the communication devices in real time along with properties of data to be transferred. Furthermore, the instructions cause the processor to determine one or more communication protocols for the data transfer and a need to switch between the one or more communication protocols for providing the seamless data transfer based on the monitored status wherein each of the one or more communication protocols is associated with a priority value and a contention value. Thereafter, the instructions cause the processor to prepare for data transfer using one or more determined communication protocols by performing at least one of splitting of the data into one or more subset of data based on size of data and type of data and sequencing the one or more subset of data based on sequencing information using a neural network wherein the neural network is a multi-layer model trained based on properties of the data, data storage space of the communication devices speed of data transfer and a communication channel available for the data transfer. Further, the instructions cause the processor to identify one or more optimum communication protocols from the one or more determined communication protocols available for the data transfer using the neural network based on order of the priority value and the contention value for each of the one or more subset of data to be transferred wherein the order of the priority value and the contention value is updated in real-time based on the monitored status of the one or more network parameters and the power associated with the communication devices. Finally, the instructions cause the processor to transfer the one or more subset of data along with sequencing information through one or more communication channels using the identified one or more optimum communication protocols until change in the monitored status of the one or more network parameters and the power associated with the communication devices is detected to switch the one or more optimum communication protocols for the seamless data transfer.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which:

FIG. 2b shows Table 1 illustrating communication protocols along with corresponding priority values and contention values in accordance with some embodiments of the present disclosure.

FIG. 2d shows Table 2 illustrating monitored status of network parameters and power associated with the smartphones in accordance with some embodiments of the present disclosure.

FIG. 2e shows Table 3 illustrating sequencing of one or more subsets of audio file and video file based on sequencing information in accordance with some embodiments of the present disclosure.

FIG. 2f shows Table 4 illustrating updated priority value and the contention value corresponding to a change in the monitored status in accordance with some embodiments of the present disclosure.

Figure 1A:
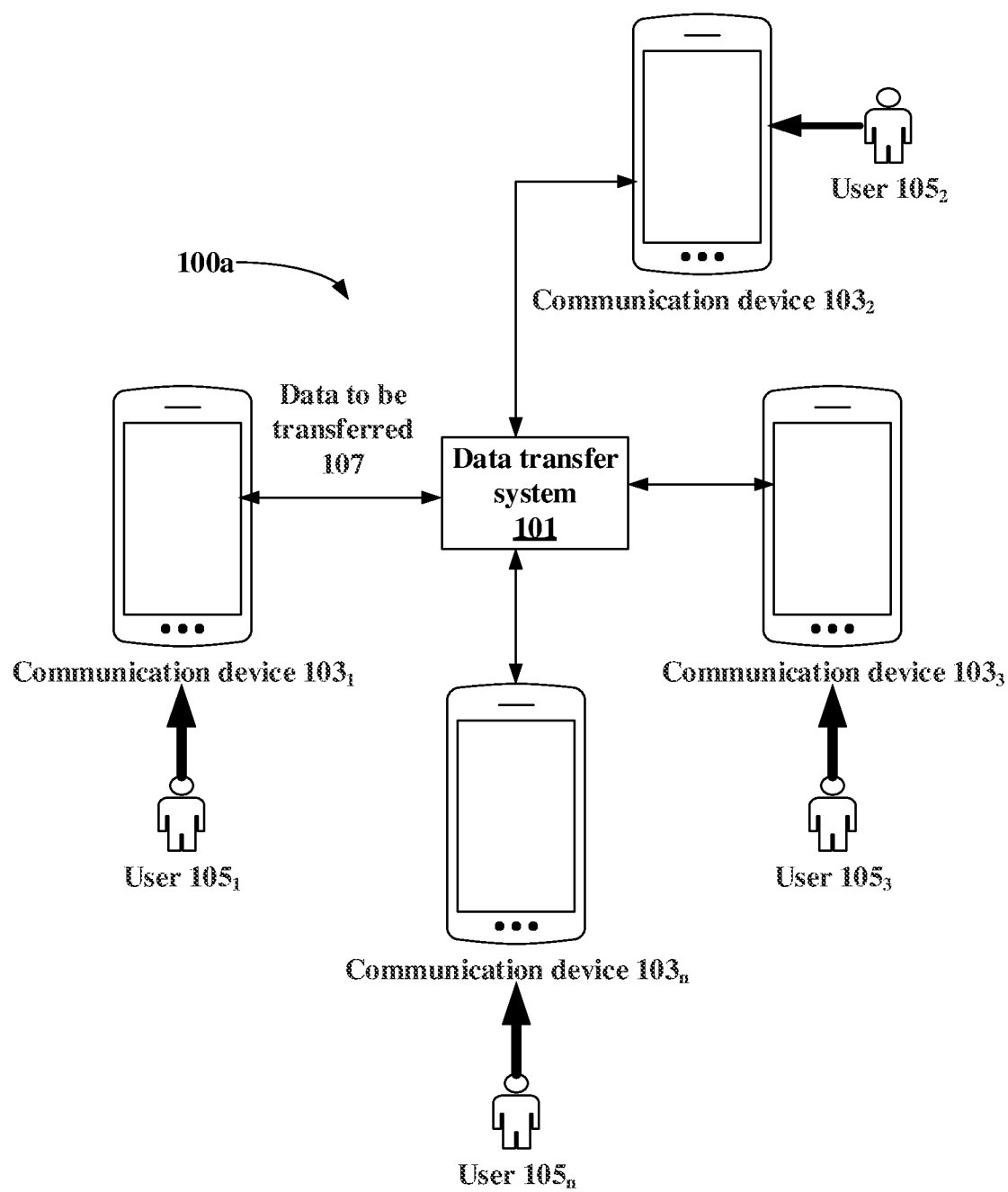
FIGS. 1a-1b shows exemplary architectures for providing seamless data transfer between communication devices in accordance with some embodiments of the present disclosure.

It should be appreciated by those skilled in the art that any flow diagrams and timing diagrams herein represent conceptual views of illustrative device embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternative falling within the scope of the disclosure.

The terms "comprises", "comprising", "includes", "including" or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and a data transfer system for providing seamless data transfer between communication devices. The communication devices may send data transfer requests to the data transfer system. Upon receiving the data transfer requests, the data transfer system may monitor status of one or more network parameters and power associated with the communication devices in real time. The one or more network parameters may include network availability, range of network available, network suitability, and available network data plan associated with the communication devices. The network suitability may be determined by the data transfer system based on the network availability, the range of network available and monitored status of the power associated with the communication devices. The data transfer system may also monitor properties of data to be transferred. The properties of the data may comprise type of data and size of data. The type of data may be one of media, video, audio, or text. Further, the data transfer system may determine one or more communication protocols available at the communication devices for the data transfer. Each of the one or more communication protocols is associated with a priority value and a contention value. The data transfer system may also determine a need to switch between the one or more communication protocols for providing the seamless data transfer based on the monitored status. Thereafter, the data transfer system may prepare for data transfer using one or more determined communication protocols by performing at least one of splitting of the data into one or more subset of data and sequencing the one or more subset of data. The data transfer system utilizes a neural network for splitting the data into one or more subset of data and sequencing the one or more subset of data. The neural network may be trained based on properties of the data, data storage space of the communication devices, speed of data transfer and a communication channel available for the data transfer. The neural network may perform splitting based on size of data and type of data. In other words, when the size of the data exceeds a predefined threshold and/or when the data is of the media type, the data splitting may be performed.

Further, the neural network may perform sequencing based on sequencing information. The sequencing information may comprise time-stamp information and a sequence Identification (ID) information, available at the communication devices. The sequencing information may be assigned to each of the one or more subset of data based on the one or more determined communication protocols, size of the data, sequence order and status of data transfer. Further, the neural network of the data transfer system may identify one or more optimum communication protocols for each of the one or more subset of data to be transferred from the one or more determined communication protocols available for the data transfer. The neural network may identify the one or more optimum communication protocols based on order of the priority value and the contention value. The priority value and the contention value may be determined based on current network availability, network coverage range, and data transfer rate associated with each of the one or more determined communication protocols for the communication device. The contention value may be further determined based on the priority value. The order of the priority value and the contention value may be updated in real-time based on the monitored status of the one or more network parameters and the power associated with the communication devices.

Upon identifying the one or more optimum communication protocols, the data transfer system may transfer the one or more subset of data along with sequencing information through one or more communication channels. The data transfer system may use the identified one or more optimum communication protocols for data transfer, until change in the monitored status of the one or more network parameters and the power associated with the communication devices is detected. When the monitored status changes, the data transfer system may switch the one or more optimum communication protocols to provide seamless data transfer. In an embodiment, the data transfer system may transfer the data using an optimum communication protocol when size of the data is within a predefined threshold. The optimum communication protocol may be determined from among the one or more determined communication protocols with highest priority value and highest contention value. The need to switch is determined when change is detected in the monitored status. The data transfer system may then switch from the optimum communication protocol to one of the one or more determined communication protocols for seamless data transfer. In this manner, the present disclosure provides a method and a data transfer system for providing seamless data transfer between communication devices thereby improving utilization of network bandwidth with optimal consumption of power associated with the communication devices and with minimal manual intervention.

Figure 1B:
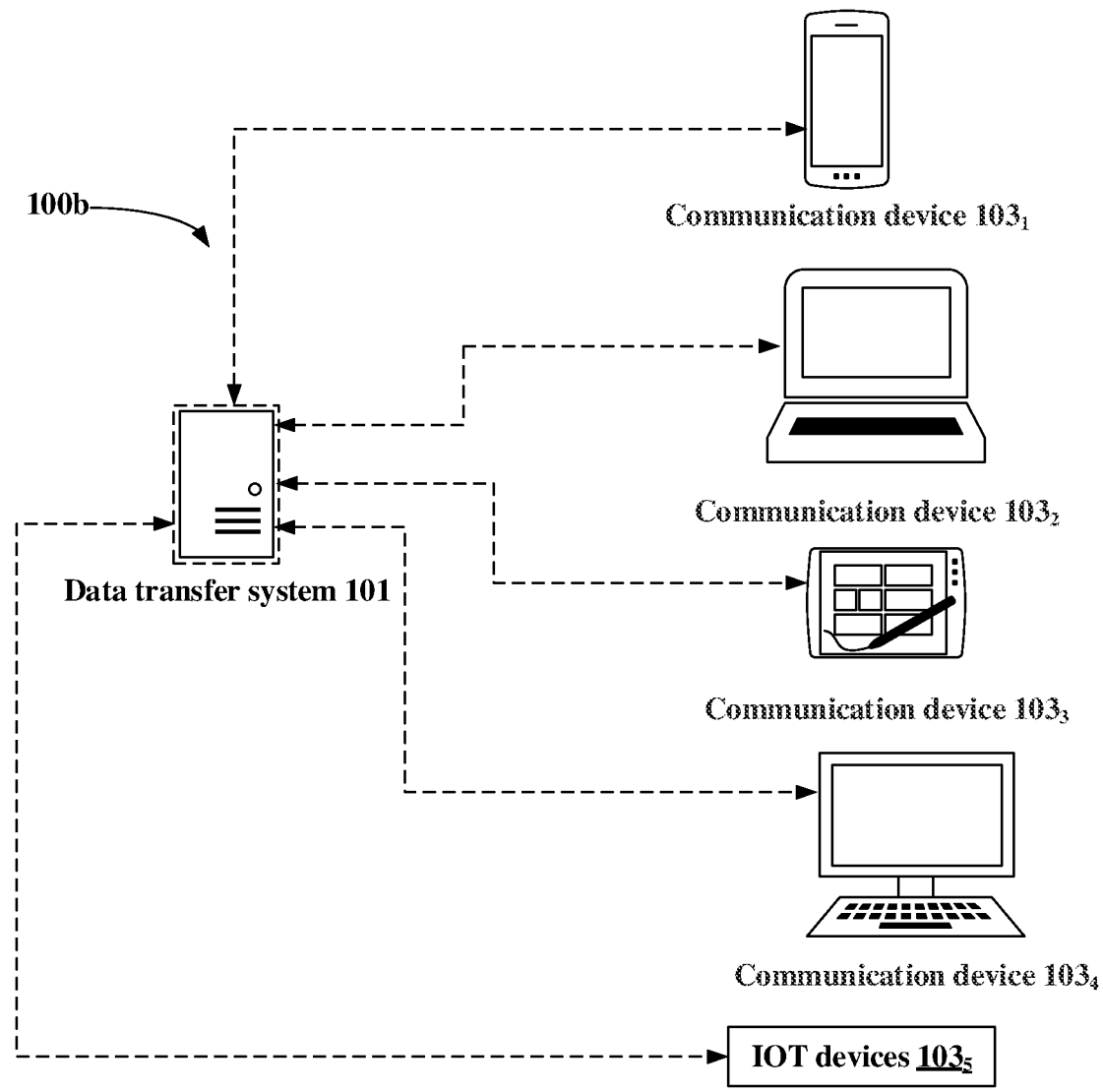

FIGS. 1a-1b shows exemplary architectures for providing seamless data transfer between communication devices in accordance with some embodiments of the present disclosure.

As shown in FIG. 1a, the architecture 100a may include one or more communication devices, communication device $103_1$ to communication device $103_n$ [alternatively referred as one or more communication devices or communication devices 103], a data transfer system 101 and one or more users, user $105_1$ associated with communication device $103_1$, user $105_2$ associated with the communication device $103_2$ and user $105_n$ associated with communication device n $103_n$ [alternatively referred as 'one or more users' or users 105]. In an embodiment, the data transfer system 101 may be configured inside the communication devices 103 as an application. In another embodiment, the data transfer system 101 may be a server to which the communication devices 103 may be associated with. As an example, the communication devices 103 may include, but not limited to, smartphones, laptops, tablets, and Internet of Things (IoT) devices. Further, the communication devices 103 may have integrated transceiver antennas to transmit and receive radio signals.

In an exemplary scenario, the user $105_1$ of a communication device $103_1$ (herein after referred as transmitting device) may send a data transfer request to the data transfer system 101 for transferring data to a communication device $103_2$ (herein after referred as receiving device). The receiving device may be the communication device which intend to receive data from the transmitting device through the data transfer system 101. The transmitting device may be the communication device which has the data to be transferred. Upon receiving the data transfer request from the transmitting device, the receiving device may initiate pairing with the transmitting device by synchronizing internal clocks prior to data transfer. The data transfer system 101 may monitor status of one or more network parameters and power associated with the transmitting device and receiving device in real time along with properties of data to be transferred. The one or more network parameters may include, but not limited to, network availability, range of network available, network suitability, and available network data plan associated with the transmitting device and receiving device. The network suitability may be determined based on the network availability, the range of network available and monitored status of the power associated with the transmitting device and receiving device. Further, the data transfer system 101 may determine one or more communication protocols available for the data transfer both at the receiving device and the transmitting device. The one or more communication protocols may include, but not limited to, Bluetooth Low Energy (BLE), Low Range (LoRa), SigFox, Wi-Fi, Wireless Highway Addressable Remote Transducer (HART), ZigBee and Z-wave. In one embodiment, the one or more communication protocols may include other short-range communication protocols as well. Each of these one or more communication protocols may be associated with a priority value and a contention value.

The data transfer system 101 may also determine a need to switch between the one or more determined communication protocols based on the monitored status to provide seamless data transfer. Thereafter, the data transfer system 101 may perform at least one of splitting the data of the transmitting device into one or more subset of data and sequencing the one or more subset of data using a neural network. The neural network 20 may be trained based on properties such as, data storage space of the receiving device, speed of data transfer supported at the transmitting device and the receiving device through a communication channel which is available for the data transfer and type of data split. The neural network may split the data into one or more subset of data based on size of data and type of data and sequence the one or more subset based on sequencing information for each of the one or more determined communication protocols. Once the data of the transmitting device is prepared for transfer, the data transfer system 101 may identify one or more optimum communication protocols for each of the one or more subset of data to be transferred using the neural network. The one or more optimum communication protocols may be identified based on order of the priority value and the contention value associated with the one or more determined communication protocols available for the data transfer.

The priority value and the contention value may be determined based on current network availability, network coverage range, and data transfer rate associated with each of the one or more determined communication protocols for the transmitting device and the receiving device. The data transfer system 101 may update the order of the priority value and the contention value in real-time based on the monitored status of the one or more network parameters and the power associated with the transmitting device and the receiving device. Once the one or more optimum communication protocols is identified, the data transfer system 101 may transfer the one or more subset of data along with sequencing information from the transmitting device to the receiving device. The one or more subset of data along with the sequencing information may be sent through one or more communication channels using the identified one or more optimum communication protocols. The transfer of the one or more subset of data may continue until a change in the monitored status of the one or more network parameters and the power associated with the transmitting device and the receiving device is detected. The change in the monitored status may be significant for switching the one or more optimum communication protocols to provide seamless data transfer.

FIG. 1b, illustrates the architecture 100b for providing seamless data transfer in a client server environment. The architecture 100b may include a data transfer system 101 and one or more communication devices 103. The one or more communication devices 103 may be client terminals. The client terminals may be smart phone, Internet of Things (IoT) devices, Personal Computers (PCs) such as laptop, tablet PC and Personal Digital Assistant (PDA). The data transfer system 101 may be implemented in a server terminal to handle the data transfer requests from the client terminals. As shown in FIG. 1b, the server terminal may be configured to provide seamless data transfer between client terminals by following the steps described in FIG. 1a illustration.

Figure 2A:
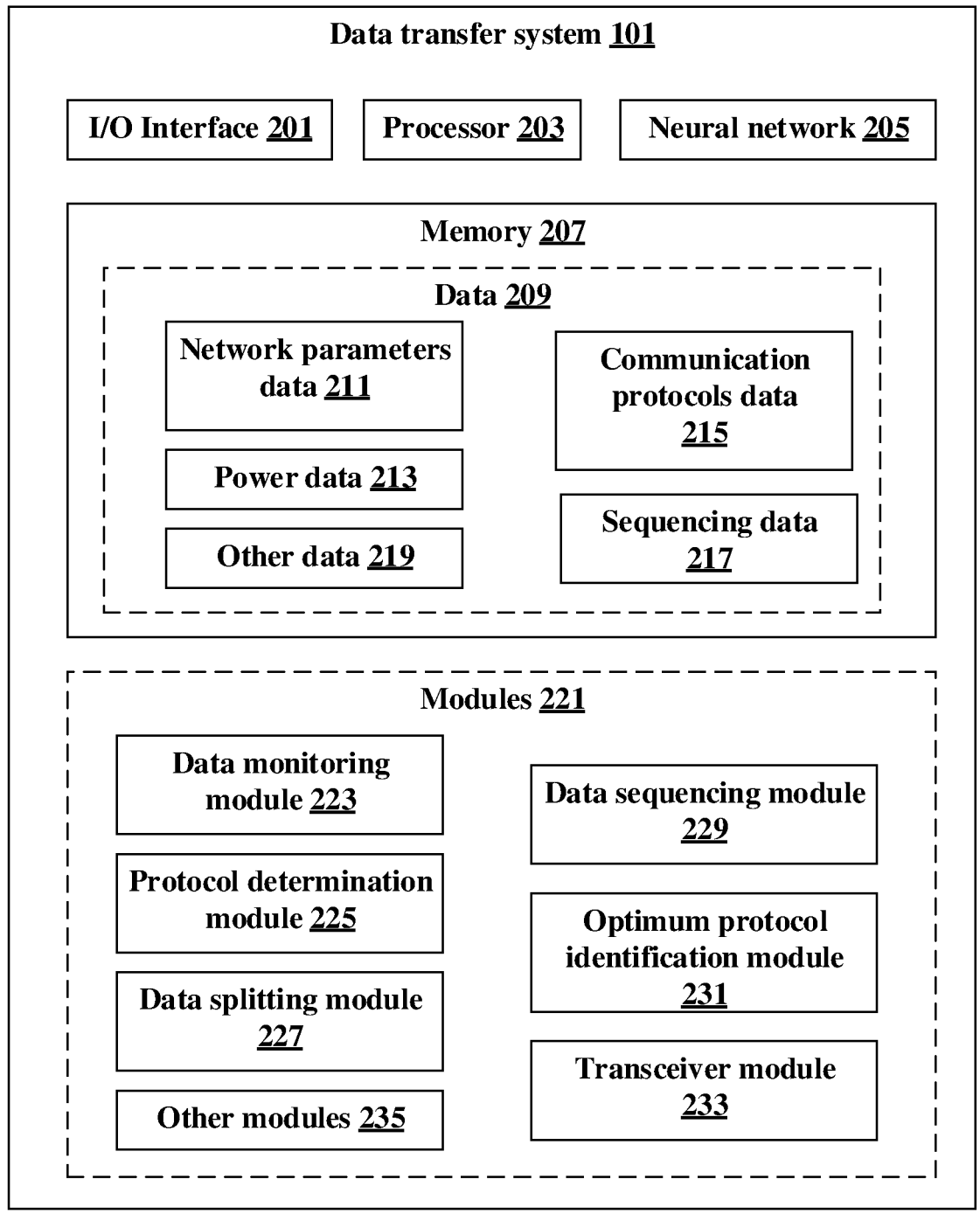
FIG. 2a shows a block diagram of a data transfer system in accordance with some embodiments of the present disclosure.

FIG. 2a shows a block diagram of a data transfer system in accordance with some embodiments of the present disclosure.

In some implementations, the data transfer system 101 may include an I/O interface 201, a processor 203, a memory 207, and a neural network 205. The I/O interface 201 may be configured to receive data transfer request, network parameters data 211 and power data 213 from the communication devices 103. The processor 203 may be configured to receive the data transfer request through the I/O interface 201. Further, the processor 203 may retrieve data from the memory 207 and interact with the modules 221 and the neural network 205 to process the data transfer request. The processor 203 further provides seamless data transfer between communication devices 103 using one or more communication protocols. In the data transfer system 101, the memory 207 may store data 209 received through the I/O interface 201, modules 221 and the processor 203. In one embodiment, the data 209 may also include network parameters data 211, power data 213, communication protocols data 215, sequencing data 217, and other data 219. The other data 219 may store data, including temporary data and temporary files, generated by the modules 221 for performing the various functions of the data transfer system 101.

In some embodiments, the data 209 stored in the memory 207 may be processed by the modules 221 of the data transfer system 101. In an example, the modules 221 may be communicatively coupled to the processor 203 configured in the data transfer system 101. The modules 221 may be present outside the memory 207 as shown in FIG. 2a and implemented as hardware. As used herein, the term modules 221 may refer to an Application Specific Integrated Circuit (ASIC), an electronic circuit, a processor 203 (shared, dedicated, or group) and memory 207 that execute one or more software or firmware programs, a combinational logic circuit, and/or other suitable components that provide the described functionality.

In some embodiments, the modules 221 may include, for example, a data monitoring module 223, a protocol determination module 225, a data splitting module 227, a data sequencing module 229, an optimum protocol identification module 231, transceiver module 233 and other modules 235. The other modules 235 may be used to perform various miscellaneous functionalities of the data transfer system 101. It will be appreciated that aforementioned modules 221 may be represented as a single module or a combination of different modules 221. Furthermore, a person of ordinary skill in the art will appreciate that in an implementation, the one or more modules 221 may be stored in the memory 207, without limiting the scope of the disclosure. The said modules 221 when configured with the functionality defined in the present disclosure will result in a novel hardware.

In an embodiment, the data monitoring module 223 may be configured to monitor status of one or more network parameters and power associated with the communication devices 103 in real time when a data transfer request is received through the I/O interface 201. The monitored status of one or more network parameters may be stored as the network parameters data 211 in the memory 207. The one or more network parameters may include, but not limited to, network availability, range of network available, network suitability, and available network data plan associated with the communication devices 103. The network suitability may be determined based on the network availability, the range of network available and monitored status of the power associated with the communication devices 103. The monitored status of the power may be stored as the power data 213 in the memory 207. Further, the data monitoring module 223 may monitor properties of data to be transferred 107. As an example, the data to be transferred 107 may include, but not limited to, a text file, image file, multi-media file, video file, and audio file.

In an embodiment, the protocol determination module 225 may determine one or more communication protocols available at the communication devices 103 for the data transfer. For example, the one or more communication protocols may include Bluetooth Low Energy (BLE), Low Range (LoRa), SigFox, Wi-Fi, Wireless Highway Addressable Remote Transducer (HART), ZigBee and Z-wave and the like. Each of these one or more communication protocols may be associated with a priority value and a contention value. The priority value and the contention value may be determined based on current network availability, network coverage range, and data transfer rate associated with each of the determined one or more communication protocols for the communication device. As an example, Wi-Fi communication protocol may be assigned with a high priority value as the speed of data transfer is high compared to other communication protocols determined for the data transfer and the network is available. Similarly, the LoRa communication protocol may be assigned with a low priority value as the speed of data transfer is medium compared to other communication protocols determined for the data transfer. Therefore, the priority value indicates the most preferable communication protocol for the data transfer. The contention value may determine number of consecutive back-off periods for which a communication channel must remain idle prior to start of data transfer. The contention value may be considered for congestion control and to avoid collisions of data when more than one communication devices 103 initiate data transfer simultaneously. Further, the contention value may be determined based on the priority value. As an example, when the priority value is high, the contention value may range from minimum contention value which may be "4" and to maximum contention value which may be "16" for Wi-Fi protocol. Similarly, the priority value is low for example, "3" for LoRa protocol, the contention value may range from minimum contention value which may be "2" to maximum contention value which may be "8". The determined one or more communication protocols along with their corresponding priority value and the contention value may be stored as the communication protocols data 215 in the memory 207. The priority value and the contention value may be utilized for identifying one or more optimum communication protocols from the one or more determined communication protocols. Further, the protocol determination module 225 also may determine a need to switch between the one or more communication protocols based on the monitored status for providing the seamless data transfer. As shown in FIG. 2b, an exemplary Table 1 illustrates communication protocols along with corresponding priority values and contention values. The priority value and the contention value are determined based on current network availability, network coverage range, and data transfer rate associated with Wi-Fi, BLE and LoRa protocols. As per Table 1 of FIG. 2b, the Wi-Fi protocol has priority value "1" which indicates for any data transfer, the most preferable communication protocol is Wi-Fi. The contention value for Wi-Fi is "16" which indicates that the communication device may start data transfer only after "16" consecutive back-off periods in an available communication channel Similar interpretations may be applied for BLE and LoRa protocols.

In an embodiment, the data splitting module 227 may split the data to be transferred 107 to one or more subset of data based on properties of the under the supervision of the neural network 205. For example, splitting of the data may be performed when the size of the data to be transferred 107 exceeds a predefined threshold. The data splitting module 227 may split the data into one or more subset of data and transmit the one or more subset of data through multiple communication channels. This improves bandwidth utilization of the communication channels. In another example, splitting of the data may be performed when the data is of the multimedia type. In this case, at least one of the one or more subset of data may be audio type and at least one of the one or more subset of data may be video type. The data of multimedia type may be split to facilitate parallel transfer of the audio type and the video type subsets of data using multiple communication protocols.

In an embodiment, the data splitting module 227 may not split the data to be transferred 107 when the size of the data is within a predefined threshold. For example, the data to be transferred 107 may be of text type having size of 50 KB. The predefined threshold may be set to 100 KB. In this case, as the size of text data is within 100 KB, the data splitting module 227 may not perform splitting. In this case, an optimum communication protocol having highest priority value and highest contention value may be identified from the determined one or more communication protocols. For example, Wi-Fi protocol may be identified to transfer the text data having size of 50 KB. Thereafter, the text data may be transferred using identified Wi-Fi protocol until a need to switch based on change in the monitored status is detected. Upon detecting the need to switch, the communication device may switch to one or more determined communication protocols for example BLE or Lora based on monitored status from Wi-Fi protocol. The switching may be performed to provide seamless data transfer.

In an embodiment, the data sequencing module 229 may sequence the one or more subset of data based on sequencing information under the supervision of the neural network 205 upon splitting of the data. The sequencing information may be assigned to each of the one or more subset of data based on the one or more determined communication protocols, size of the data, sequence order and status of data transfer. The sequencing information may comprise time-stamp information and a sequence Identification (ID) information which is available at the communication devices 103. The sequencing information may be stored as the sequencing data 217 in the memory 207.

In an embodiment, the optimum protocol identification module 231 may identify one or more optimum communication protocols for each of the one or more subset of data to be transferred under the supervision of the neural network 205. The one or more optimum communication protocols may be identified from the determined one or more communication protocols available for the data transfer based on order of the priority value and the contention value. The order of the priority value and the contention value may be updated in real-time based on the monitored status of the one or more network parameters and the power associated with the communication devices 103. In an embodiment, the optimum protocol identification module 231 may determine an optimum communication protocol with highest priority value and highest contention value from among the determined one or more communication protocols, when the size of the data is within the predefined threshold. Further, the optimum protocol identification module 231 may identify next one or more optimum communication protocols upon detecting the need to switch based on change in the monitored status and updated priority value and the contention value of the one or more determined communication protocols. The next one or more optimum communication protocols may be identified to provide seamless data transfer by switching from the current optimum communication protocol.

In an embodiment, the transceiver module 233 may transfer the one or more subset of data along with sequencing information through the one or more communication channels. The transceiver module 233 may continue to transfer of the one or more subset of data using the identified one or more optimum communication protocols, until the processor 203 detects a change in the monitored status of the one or more network parameters and the power to switch the one or more optimum communication protocols for the seamless data transfer. When the change in the monitored status is detected, the transceiver module 233 may switch the one or more optimum communication protocols. The remaining one or more subset of data may be transferred using the next one or more optimum communication protocols identified by the optimum protocol identification module 231. Due to provision of switching the one or more optimum communication protocols, the seamless data transfer between the communication devices 103 may be provided. As a result, re-transmission of data may be avoided.

Figure 2C:
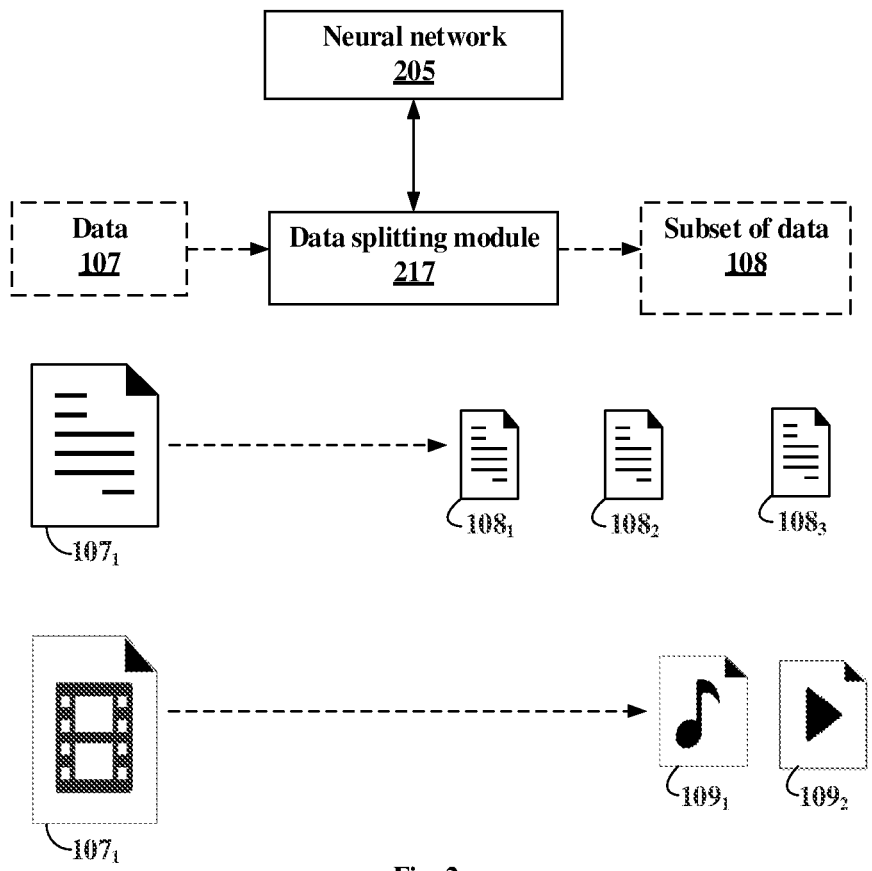
FIG. 2c illustrates process of splitting of data into one or more subset of data by a data splitting module under supervision of a neural network in accordance with some embodiments of the present disclosure.

FIG. 2c illustrates splitting of data into one or more subset of data by a data splitting module under supervision of a neural network 205 of the data transfer system in accordance with some embodiments of the present disclosure.

As shown in FIG. 2c, the data splitting module 227 may split the data to be transferred 107 into one or more subset of data under supervision of the neural network 205. As an example, the neural network 205 may be a multi-layer perceptron model which consists of multi layers of nodes. Each node may be a neuron that uses a nonlinear activation function. The neural network 205 may have one input layer, at least one hidden layer, and one output layer. The hidden layers may be adjusted appropriately for error correction. The neural network 205 may be trained based on properties of the data, data storage space of the communication devices 103, speed of data transfer and a communication channel available for the data transfer. The splitting of the data may be performed when the size of the data exceeds a predefined threshold and/or when the data is of the media type. For example, if the type of data to be transferred 107 is text, video, or audio, then the splitting may be performed based on the size of the data. As illustrated in FIG. 2c, the text data may be split into one or more subsets of data of text type such as $108_1$, $108_2$ and $108_3$. However, in case the type of data to be transferred 107 is media, then the data may be split into subsets of data of audio type $109_1$ and video type $109_2$.

Example Illustrations

As an example, a user $105_1$ of a first smartphone may send a data transfer request to a user $105_2$ of the second smartphone through a data transfer system 101. The data to be transferred 107 may include media file, video file, and audio file. Upon receiving the data transfer request, the data transfer system 101 monitors status of network parameters and power associated with the smartphones such as battery power as illustrated in Table 2 shown in FIG. 2d. The network parameters which are monitored are network availability, range of network available, and network suitability associated with the smartphones.

Thereafter, the data transfer system 101 may determine communication protocols available at both the smartphones for the data transfer. As an example, the determined communication protocols available for the data transfer may be Wi-Fi, BLE and LoRa. Each of these communication protocols may be associated with a priority value and a contention value. The priority value and the contention value may be determined based on current network availability, network coverage range, and data transfer rate associated with each of the determined communication protocols for the communication device. The determined protocols along with corresponding priority value, network range, data transfer rate, network availability and contention value are as illustrated in Table 1 shown in FIG. 2b. As per Table 1 of FIG. 2b, the Wi-Fi protocol has the highest contention value and has highest priority value with respect to other communication protocols like BLE and LoRa, as Wi-Fi has highest data rate and the network is available.

Once the Table 1 is generated, the data transfer system 101 may determine whether to perform splitting of data or not into one or more subset of data. As an example, the data transfer system 101 may detect the need of splitting the media into one or more subset of data such as audio file and video file to accelerate the data transfer process. Further, the data transfer system 101 may verify the size of video file and audio file with the predefined threshold value for splitting.

As an example, the size of video file may be 10 MB and the size of audio file may be 4 MB. The predefined threshold may be 2 MB. As size of the audio file and video file exceed 2 MB, the data transfer system 101 may perform splitting. The video file may be split into five subsets of data and the audio file may be split into two subsets of data. The data transfer system 101 may determine the optimum communication protocol for the video transfer as the Wi-Fi protocol. However, the audio file has smaller size with respect to video file, hence is transferred using BLE protocol. Prior to transfer of the data, the audio file and the video file may be sequenced based on sequencing information as illustrated in Table 3 shown in FIG. 2e. The sequencing information may comprise time-stamp information and a sequence Identification (ID) information which is available at the communication devices 103. The sequencing information may be stored as the sequencing data 217 in the memory 207. As shown in Table 3, the two subsets of audio file may bear sequence ID as A1680 and A1682 with sequence order SEQ 1 and SEQ 2 respectively. Similarly, the five subsets of video file may bear sequence ID as V1684, V1686, V1688, V1690 and V1692 with sequence order SEQ 3, SEQ 4, SEQ 5, SEQ 6, and SEQ 7 respectively. The sequence order of each subsets of data may keep track of order in which data has to be transferred using optimum communication protocols. As an example, the subset of data A1680 having SEQ 1 may be transferred first followed by transfer of subset of data A1682 having SEQ2. The data transfer system 101 may also keep track of time stamp information to switch the optimum communication protocol if a change in monitored status is detected. The sequence ID, along with time stamp information may be required for joining the subsets of data at the destination device or the receiving device to access the transferred data from the source device or the transmitting device. The two subsets of audio file bearing sequence ID A1680 and A1682 may be transferred at a data transfer rate of 3 Mbps using BLE protocol. Also, the five subsets of video file bearing sequence ID V1684, V1686, V1688, V1690 and V1692 may be transferred at 54 Mbps data transfer rate using Wi-Fi protocol.

Here, the data transfer system 101 may identify BLE as optimum communication protocol for transfer of audio file and Wi-Fi as optimum protocol for transfer of video file. Upon identifying the optimum communication protocols, the data transfer system 101 may transfer the audio file and video file using BLE and Wi-Fi protocols respectively. Once the audio file is transferred to the smartphone, the corresponding status of data transfer may be updated to "COMPLETED" from "PENDING". Further, upon completion of transfer of video file, the status of data transfer may be updated in a similar manner.

In another exemplary scenario, the battery power of the first smartphone may become low after a duration of time from the start of data transfer. Due to change in status of battery power, change in monitored status may be detected by the data transfer system 101. Further, the data transfer system 101 may detect that the remaining battery power associated with the first smartphone may not be adequate to complete the transfer of video file using Wi-Fi. For example, the data transfer system 101 may detect low battery power of the first smartphone during transfer of second video subset of data having sequence ID V1686 and sequence order SEQ4. The data transfer system 101 may detect a need to switch from the Wi-Fi protocol which is consuming more battery power. Due to the change in the monitored status, which is the "battery power", the Table 1 of FIG. 2b will be updated to Table 4 as shown in FIG. 2f with updated priority value and the contention value. The data transfer system 101 may identify BLE as next optimum communication protocol based on updated priority value and contention value as shown. Because transferring data using BLE protocol may ensure seamless data transfer in low battery condition of the first smartphone.

To continue the transfer of video file, the data transfer system 101 may switch to identified BLE protocol to transfer remaining video subsets of data, which include subsets of data having sequence ID V1688, V1690 and V1692. In this manner, switching of communication protocols facilitates uninterrupted data transfer.

Figure 3:
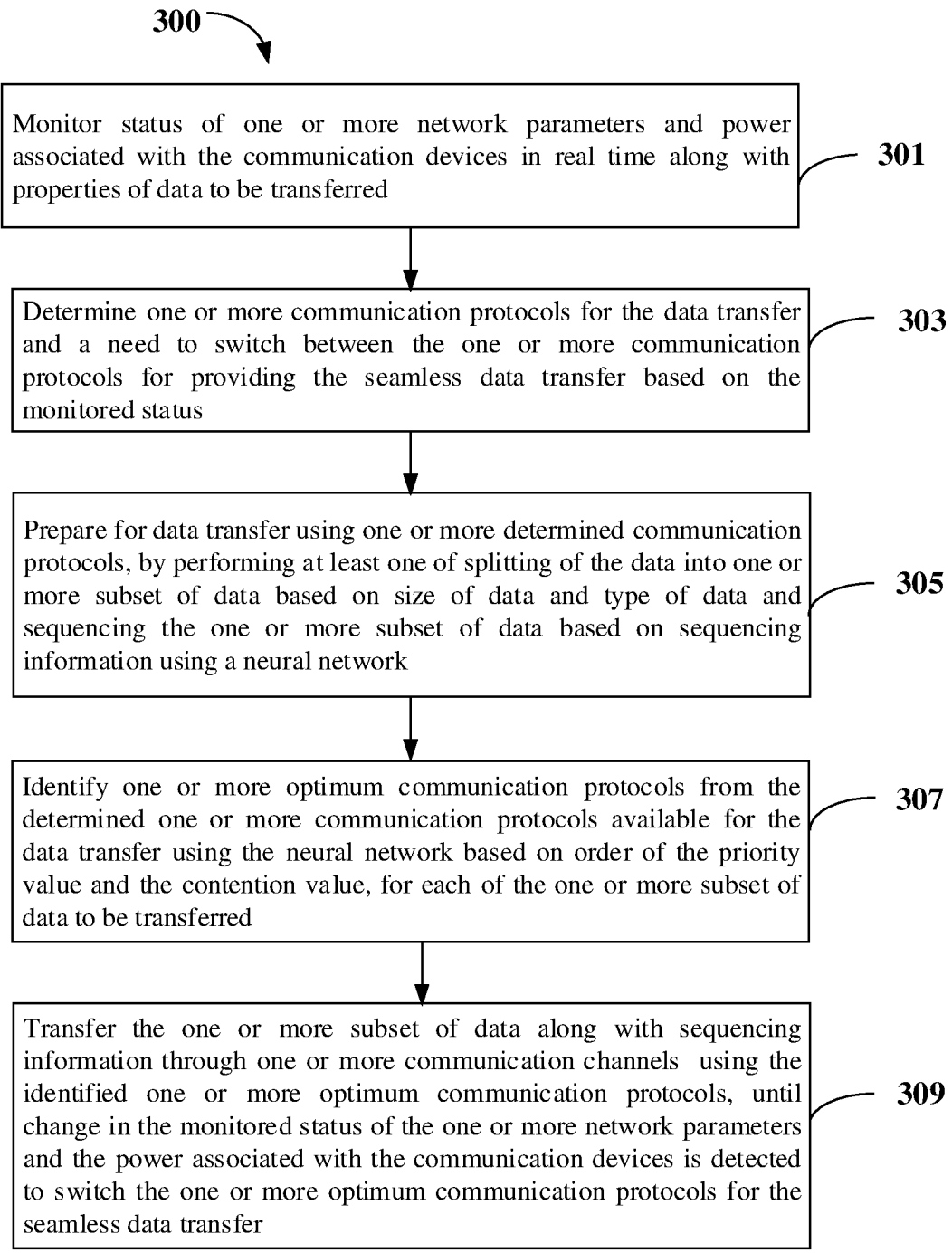
FIG. 3 shows a flow chart illustrating a method for providing seamless data transfer between communication devices in accordance with some embodiments of the present disclosure.

FIG. 3 shows a flow chart illustrating a method for providing seamless data transfer between communication devices 103 in accordance with some embodiments of the present disclosure.

As illustrated in FIG. 3, the method 300 includes one or more blocks illustrating a method for providing seamless data transfer between communication devices 103. The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 301, the method may include monitoring, by a data transfer system 101, status of one or more network parameters and power associated with the communication devices 103 in real time. The status related to one or more network parameters may include network availability, range of network available, network suitability, and available network data plan associated with the communication devices 103. The network suitability may be determined based on the network availability, the range of network available and monitored status of the power associated with the communication devices 103. The properties of data to be transferred 107 may also be monitored to determine necessity of splitting. The properties of the data may comprise type of data and size of data. The type of data may be one of media, video, audio, or text.

At block 303, the method may include determining, by the data transfer system 101, one or more communication protocols for the data transfer. Each of the one or more communication protocols may be associated with a priority value and a contention value. The priority value and the contention value may be determined based on current network availability, network coverage range, and data transfer rate associated with each of the determined one or more communication protocols for the communication device. The contention value may be further determined based on priority value. The method may also include determining a need to switch between the one or more communication protocols when a change in the monitored status is detected. The need to switch between the one or more communication protocols may be determined for providing the seamless data transfer between the communication devices 103.

At block 305, the method may include preparing for data transfer by the data transfer system 101 using one or more determined communication protocols. The data to be transferred 107 may be prepared by performing at least one of splitting of the data and sequencing the one or more subset of data using a neural network 205. The data may be split into one or more subset of data based on size of data and type of data using the neural network 205. The one or more subset of data may be sequenced based on sequencing information using the neural network 205. The neural network 205 may be trained based on properties of the data, data storage space of the communication devices 103, speed of data transfer and a communication channel available for the data transfer.

At block 307, the method may include identifying, by the data transfer system 101, one or more optimum communication protocols for each of the one or more subset of data to be transferred. The one or more optimum communication protocols may be identified from the determined one or more communication protocols available for the data transfer using the neural network 205. The identification of one or more optimum communication protocols may be performed based on order of the priority value and the contention value. The order of the priority value and the contention value may be updated in real-time based on the monitored status of the one or more network parameters and the power associated with the communication devices 103.

At block 309, the method may include transferring, by the data transfer system 101, the one or more subset of data along with sequencing information. The one or more subset of data may be transferred through one or more communication channels using the identified one or more optimum communication protocols. The one or more subset of data may be transferred until change in the monitored status of the one or more network parameters and the power associated with the communication devices 103 is detected. The change in the monitored status may be detected to switch the one or more optimum communication protocols for the seamless data transfer.

Computer System

Figure 4:
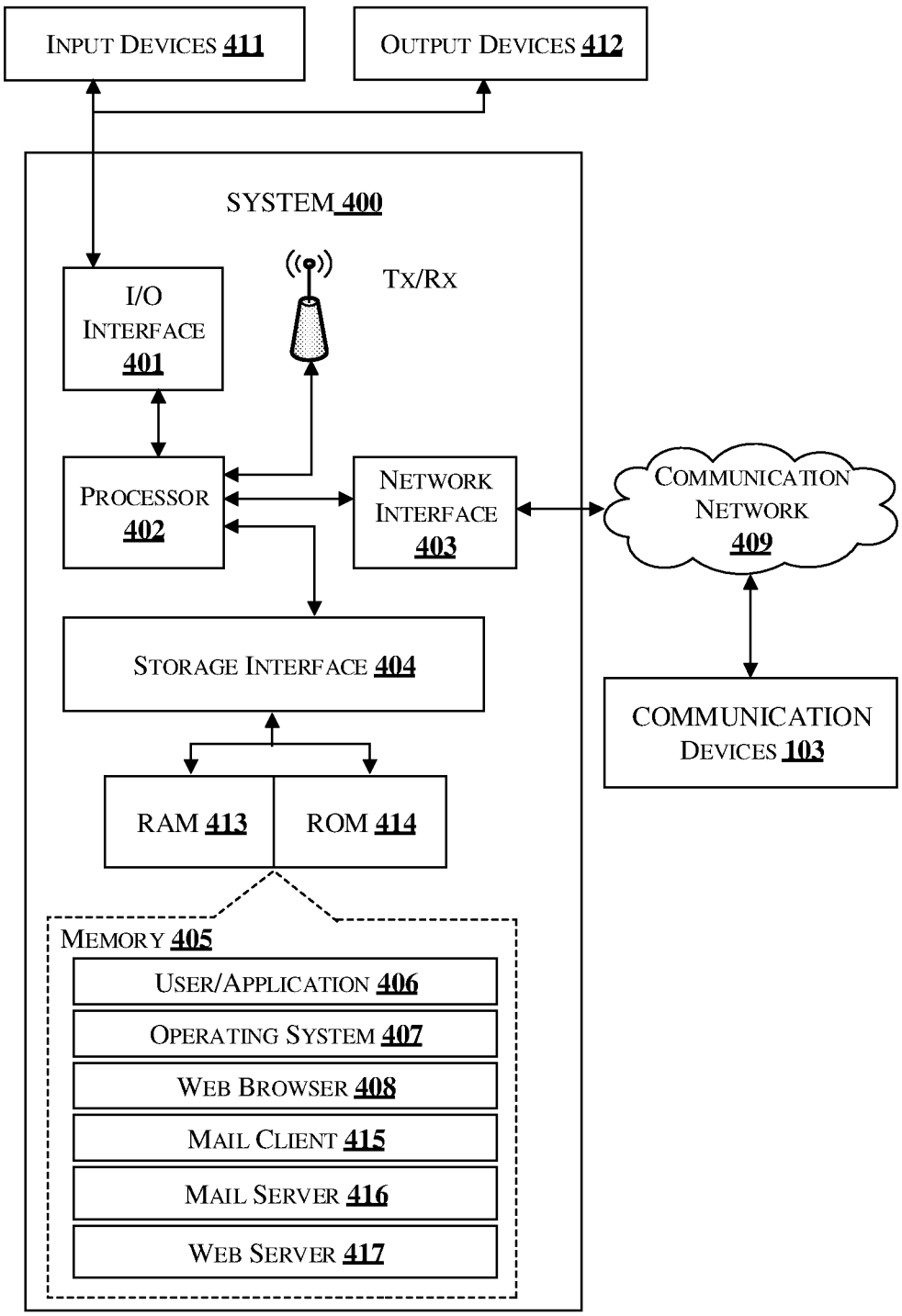
FIG. 4 shows a block diagram of an exemplary computer system for implementing embodiments consistent with the present disclosure.

FIG. 4 illustrates a block diagram of an exemplary computer system 400 for implementing embodiments consistent with the present disclosure. In an embodiment, the computer system 400 may be a system for providing seamless data transfer between communicating devices. The computer system 400 may include a central processing unit ("CPU" or "processor") 402. The processor 402 may comprise at least one data processor for executing program components for executing user or system-generated business processes. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc. Using the I/O interface 401, the computer system 400 may communicate with one or more I/O devices 411 and 412.

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc.

The communication network 409 can be implemented as one of the several types of networks, such as intranet or Local Area Network (LAN) and such within the organization. The communication network 409 may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc.

In some embodiments, the processor 402 may be disposed in communication with a memory 405 (e.g., RAM 413, ROM 414, etc. as shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user/application 406, an operating system 407, a web browser 408, mail client 415, mail server 416, web server 417 and the like. In some embodiments, computer system 400 may store user/application data 406, such as the data, variables, records, etc. as described in this invention. Such databases may be implemented as fault-tolerant, relational, scalable, secure databases such as Oracle® or Sybase®.

The operating system 407 may facilitate resource management and operation of the computer system 400. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like. A user interface may facilitate display, execution, interaction, manipulation, or operation of program components through textual or graphical facilities. For example, user interfaces may provide computer interaction interface elements on a display system operatively connected to the computer system 400, such as cursors, icons, check boxes, menus, windows, widgets, etc. Graphical User Interfaces (GUIs) may be employed, including, without limitation, APPLE MACINTOSH® operating systems, IBM™ OS/2, MICROSOFT™ WINDOWS™ (XP™ VISTA™/7/8, 10 etc.), Unix® X-Windows, web interface libraries (e.g., AJAX™, DHTML™, ADOBE® FLASH™, JAVASCRIPT™, JAVA™, etc.), or the like.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the embodiment of the present disclosure are illustrated herein.

In an embodiment, the present disclosure provides a method and a data transfer system for providing seamless data transfer between communication devices.

In an embodiment, the present disclosure provides a method for automatically controlling switching of one or more optimum communication protocols based on the monitored status of the one or more network parameters and power associated with the communication devices. Hence reduces manual intervention as well as improves throughput of data transfer system. Also, the method ensures enhanced bandwidth utilization of communication channels.

In an embodiment, in the present disclosure, the data transfer system detects change in the monitored status and proactively switch the one or more optimum communication protocols to avoid interruption of the data transfer using the one or more optimum communication protocols. Hence, the loss of already transferred data at the communication devices is avoided. This saves power consumption of the communication devices and increases resource utilization.

In an embodiment, the present disclosure facilitates parallel data transfer by splitting the data into subsets of data based on type of data and transfers subsets of data using multiple communication protocols simultaneously. The method utilizes multiple communication channels for parallel data transfer instead of utilizing only one dedicated communication channel using single communication protocol. Hence, the overall time taken for data transfer is reduced.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise. The enumerated listing of items does not imply that any or all the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Architecture |
| 101 | Data transfer system |
| 103 | Communication device |
| 105 | User |
| 107 | Data to be transferred |
| $108_1, 108_2, 108_3,$ $109_1, 109_2$ | Subset of data |
| 201 | I/O interface |
| 203 | Processor |
| 205 | Neural network |
| 207 | Memory |
| 209 | Data |
| 211 | Network parameters data |
| 213 | Power data |
| 215 | Communication protocols data |
| 217 | Sequencing data |
| 219 | Other data |
| 221 | Modules |
| 223 | Data monitoring module |
| 225 | Protocol determination module |
| 227 | Data splitting module |
| 229 | Data sequencing module |
| 231 | Optimum protocol identification module |
| 233 | Transceiver module |
| 235 | Other modules |
| 400 | System |
| 401 | I/O Interface |
| 402 | Processor |
| 403 | Network interface |
| 404 | Storage interface |
| 405 | Memory |
| 406 | User/Application |
| 407 | Operating system |
| 408 | Web browser |
| 409 | Communication network |
| 411 | Input device |
| 412 | Output device |
| 413 | RAM |
| 414 | ROM |
| 415 | Mail client |
| 416 | Mail server |
| 417 | Web server |

What is claimed is:

1. A method for providing seamless data transfer between communication devices, the method comprising:
monitoring, by a data transfer system, status of one or more network parameters and power associated with the communication devices in real time along with properties of data to be transferred;

determining, by the data transfer system, one or more communication protocols for the data transfer and a need to switch between the one or more communication protocols for providing the seamless data transfer based on the monitored status, wherein each of the one or more communication protocols is associated with a priority value and a contention value;

preparing for data transfer, by the data transfer system, using one or more determined communication protocols, by performing at least one of splitting of the data into one or more subset of data based on size of data and type of data and sequencing the one or more subset of data based on sequencing information using a neural network, wherein the neural network is a multi-layer model trained based on properties of the data, data storage space of the communication devices, speed of data transfer and a communication channel available for the data transfer;

identifying, by the data transfer system, one or more optimum communication protocols from the one or more determined communication protocols available for the data transfer using the neural network based on order of the priority value and the contention value, for each of the one or more subset of data to be transferred, wherein the order of the priority value and the contention value is updated in real-time based on the monitored status of the one or more network parameters and the power associated with the communication devices; and transferring, by the data transfer system, the one or more subset of data along with sequencing information through one or more communication channels using the identified one or more optimum communication protocols, until change in the monitored status of the one or more network parameters and the power associated with the communication devices is detected to switch the one or more optimum communication protocols for the seamless data transfer.

2. The method as claimed in claim 1, wherein the properties of the data comprises type of data and size of data, wherein the type of data is one of media, video, audio, or text and wherein the splitting of the data is performed for at least one of when the size of the data exceeds a predefined threshold or when the data is of the media type.

3. The method as claimed in claim 1, wherein the priority value and the contention value are determined based on current network availability, network coverage range, and data transfer rate associated with each of the one or more determined communication protocols for the communication device, and wherein the contention value is further determined based on priority value.

4. The method as claimed in claim 1, wherein the status related to one or more network parameters includes network availability, range of network available, network suitability, and available network data plan associated with the communication devices, wherein the network suitability is determined based on the network availability, the range of network available and monitored status of the power associated with the communication devices.

5. The method as claimed in claim 1 comprises:
transferring the data using an optimum communication protocol wherein the optimum communication protocol is determined from among the one or more determined communication protocols with highest priority value and highest contention value, when size of the data is within a predefined threshold; and switching from the optimum communication protocol to one of the one or more determined communication protocols for seamless data transfer upon detecting the need to switch based on change in the monitored status.

6. The method as claimed in claim 1, wherein the sequencing information comprises time-stamp information and a sequence Identification (ID) information which is available at the communication devices, and wherein the sequencing information is assigned to each of the one or more subset of data based on the one or more determined communication protocols, size of the data, sequence order and status of data transfer.

7. A data transfer system for providing seamless data transfer between communication devices, the data transfer system comprises:
a processor; and
a memory communicatively coupled to the processor, wherein the memory stores the processor-executable instructions, which, on execution, causes the processor to:
monitor status of one or more network parameters and power associated with the communication devices in real time along with properties of data to be transferred;
determine one or more communication protocols available at the communication devices for the data transfer and a need to switch between the one or more communication protocols for providing the seamless data transfer based on the monitored status, wherein each of the one or more communication protocols is associated with a priority value and a contention value;
prepare for data transfer using one or more determined communication protocols by performing at least one of splitting of the data into one or more subset of data based on size of data and type of data and sequencing the one or more subset of data based on sequencing information using a neural network, wherein the neural network is a multi-layer model trained based on properties of the data, data storage space of the communication devices, speed of data transfer and a communication channel available for the data transfer;
identify one or more optimum communication protocols from the one or more determined communication protocols available for the data transfer using the neural network based on order of the priority value and the contention value, for each of the one or more subset of data to be transferred, wherein the order of the priority value and the contention value is updated in real-time based on the monitored status of the one or more network parameters and the power associated with the communication devices; and
transfer the one or more subset of data along with sequencing information through one or more communication channels using the identified one or more optimum communication protocols, until the processor detects a change in the monitored status of the one or more network parameters and the power associated with the communication devices to switch the one or more optimum communication protocols for the seamless data transfer.

8. The data transfer system as claimed in claim 7, wherein the properties of the data comprises type of data and size of data, wherein the type of data is one of media, video, audio, or text, wherein the processor performs splitting of the data for at least one of when the size of the data exceeds a predefined threshold or when the data is of the media type.

9. The data transfer system as claimed in claim 7, wherein the processor determines priority value and the contention value based on current network availability, network coverage range, and data transfer rate associated with each of the one or more determined communication protocols for the communication device, and wherein the contention value is further determined based on priority value.

10. The data transfer system as claimed in claim 7, wherein the processor performs one or more steps comprising:
   transferring the data using an optimum communication protocol wherein the processor determines the optimum communication protocol from among the one or more determined communication protocols with highest priority value and highest contention value, when the size of the data is within a predefined threshold; and
   switching from the optimum communication protocol to one of the one or more determined communication protocols for seamless data transfer upon detecting the need to switch based on change in the monitored status.

11. The data transfer system as claimed in claim 7, wherein the status related to one or more network parameters includes network availability, range of network available, network suitability, and available network data plan associated with the communication devices, wherein the processor determines the network suitability based on the network availability, the range of network available and monitored status of the power associated with the communication devices.

12. The data transfer system as claimed in claim 7, wherein the sequencing information comprises time-stamp information and a sequence Identification (ID) information which is available at the communication devices, and wherein the sequencing information is assigned to each of the one or more subset of data based on the one or more determined communication protocols, size of the data, sequence order and status of data transfer.

13. A non-transitory computer readable medium including instructions stored thereon that when processed by at least one processor causes the processor to perform steps comprising:
   monitoring, status of one or more network parameters and power associated with the communication devices in real time along with properties of data to be transferred;
   determining, one or more communication protocols for the data transfer and a need to switch between the one or more communication protocols for providing the seamless data transfer based on the monitored status, wherein each of the one or more communication protocols is associated with a priority value and a contention value;
   preparing for data transfer, using one or more determined communication protocols, by performing at least one of splitting of the data into one or more subset of data based on size of data and type of data and sequencing the one or more subset of data based on sequencing information using a neural network, wherein the neural network is a multi-layer model trained based on properties of the data, data storage space of the communication devices, speed of data transfer and a communication channel available for the data transfer;
   identifying, one or more optimum communication protocols from the one or more determined communication protocols available for the data transfer using the neural network based on order of the priority value and the contention value, for each of the one or more subset of data to be transferred, wherein the order of the priority value and the contention value is updated in real-time based on the monitored status of the one or more network parameters and the power associated with the communication devices; and
   transferring, the one or more subset of data along with sequencing information through one or more communication channels using the identified one or more optimum communication protocols, until change in the monitored status of the one or more network parameters and the power associated with the communication devices is detected to switch the one or more optimum communication protocols for the seamless data transfer.

14. The non-transitory computer readable medium as claimed in claim 13, wherein the instructions causes the processor to perform one or more steps comprising:
   transferring the data using an optimum communication protocol wherein the processor determines the optimum communication protocol from among the one or more determined communication protocols with highest priority value and highest contention value, when the size of the data is within a predefined threshold; and
   switching from the optimum communication protocol to one of the one or more determined communication protocols for seamless data transfer upon detecting the need to switch based on change in the monitored status.

15. The non-transitory computer readable medium as claimed in claim 13, wherein the properties of the data comprises type of data and size of data, wherein the type of data is one of media, video, audio, or text, wherein the processor performs splitting of the data for at least one of when the size of the data exceeds a predefined threshold or when the data is of the media type.

16. The non-transitory computer readable medium as claimed in claim 13, wherein the instructions causes the processor to determine priority value and the contention value based on current network availability, network coverage range, and data transfer rate associated with each of the one or more determined communication protocols for the communication device, and wherein the contention value is further determined based on priority value.

17. The non-transitory computer readable medium as claimed in claim 13, wherein the status related to one or more network parameters includes network availability, range of network available, network suitability, and available network data plan associated with the communication devices, wherein the processor determines the network suitability based on the network availability, the range of network available and monitored status of the power associated with the communication devices.

18. The non-transitory computer readable medium as claimed in claim 13, wherein the sequencing information comprises time-stamp information and a sequence Identification (ID) information which is available at the communication devices, and wherein the sequencing information is assigned to each of the one or more subset of data based on the one or more determined communication protocols, size of the data, sequence order and status of data transfer.

* * * * *